United States Patent [19]
Nakaniwa et al.

[11] Patent Number: 5,261,078
[45] Date of Patent: Nov. 9, 1993

[54] SYSTEM FOR TRANSFERRING DATA BETWEEN PROGRAM DEVELOPMENT COMPUTER AND CONTROL UNIT VIA SPECIFIC MEMORY ADDRESSES OF INTERFACE COMPUTER

[75] Inventors: Shinpei Nakaniwa; Hirohisa Nashima, both of Isesaki, Japan

[73] Assignee: Japan Electronic Control Systems Co., Ltd., Isesaki, Japan

[21] Appl. No.: 560,774

[22] Filed: Jul. 31, 1990

[30] Foreign Application Priority Data

Jul. 13, 1989 [JP] Japan .................. 1-196947

[51] Int. Cl.⁵ .................................. G06F 15/16
[52] U.S. Cl. ........................... 395/500; 364/191; 364/DIG. 1
[58] Field of Search ......... 371/16.2, 16.1, 19; 395/500, 800; 364/191, 192

[56] References Cited

U.S. PATENT DOCUMENTS

| | | | |
|---|---|---|---|
| 4,115,853 | 9/1978 | Dummermuth | 395/500 |
| 4,189,773 | 2/1980 | O'Meara | 364/200 |
| 4,312,066 | 1/1982 | Bantz et al. | 371/16 |
| 4,466,098 | 8/1984 | Southard | 371/9.1 |
| 4,520,440 | 5/1985 | Buonomo et al. | 371/16.1 |
| 4,691,316 | 9/1987 | Phillips | 371/16.2 |
| 4,700,292 | 10/1987 | Campanini | 395/200 |
| 4,796,258 | 1/1989 | Boyce et al. | 371/16.2 |
| 4,847,805 | 7/1989 | Ishii et al. | 364/900 |
| 4,899,306 | 2/1990 | Greer | 371/16.1 |
| 4,918,594 | 4/1990 | Onizuka | 364/200 |
| 4,937,740 | 6/1990 | Agarwal et al. | 371/19 |
| 5,022,028 | 6/1991 | Edmonds et al. | 371/19 |
| 5,134,701 | 7/1992 | Mueller et al. | 371/19 |

Primary Examiner—Thomas C. Lee
Attorney, Agent, or Firm—Foley & Lardner

[57] ABSTRACT

A development computer or first computer provided with a program development-supporting tool for checking an operation of a new control program written by a high-level language is disposed independently from a computer to be developed or second computer. Control based on a new control program written in a high-level language for the computer to be developed or second computer is executed by outputting the result of processing of the new control program by the development computer into the computer to be developed or second computer.

8 Claims, 9 Drawing Sheets

SYSTEM FOR TRANSFERRING DATA BETWEEN PROGRAM DEVELOPMENT COMPUTER AND CONTROL UNIT VIA SPECIFIC MEMORY ADDRESSES OF INTERFACE COMPUTER

BACKGROUND OF THE INVENTION (1) Field of the Invention

The present invention relates to a method and apparatus for the development of a control program. More particularly, the present invention relates to a method and apparatus capable of developing newly and efficiently a control program for a computer for a control unit not provided with a program development-supporting tool for checking a newly prepared control program.

(2) Description of the Related Art

Recently, micro-computers are frequently used for various control devices of automobiles, and especially in an engine control apparatus. In order to improve engine performances, a complicated logic program is executed by a micro-computer to control the fuel supply quantity and the ignition timing.

In forming a program for the control by the micro-computer, use of a high-level language which is a programming language having a structure relatively close to the structure of the human language, such as C, FORTRAN, PASCAL, COBOL or PL/I, is considered advantageous, because the burden on a programmer is reduced and the number of errors can be decreased. Namely, in the case of assembler language, which is closer to machine language than high-level languages, the flow of the program can hardly be checked unless a flow chart is drawn for facilitation. In contrast, in the case of high-level language, since the structured design is often adopted, the flow of the program can be easily checked and an error can be easily found. Accordingly, programming using a high-level language is considered desirable.

Furthermore, a program can be efficiently developed by using, instead of a micro-computer to be developed, which is assembled in a product based on a machine language translated from a program of a high-level language by a compiler, an emulator. The emulator performs an equivalent operation and checks the content of the operation based on the high-level language.

However, when a high-performance CPU is newly developed, development of a high-level language corresponding to this CPU is generally deferred and in an extreme case, the development of a high-level language is not undertaken at all. Accordingly, even if a high-performance CPU is developed, in order to develop a new control program by this CPU, it is necessary to write the control program in an assembler language, with the result that the burden on a programmer increases and the error occurrence rate increases. Therefore, the number of steps for developing the control program increases. Hence, it is desired that programming with a high-level language will become possible even for newly developed CPUs. Moreover, it often happens that even the above-mentioned emulator fails to cope with new CPU, making it difficult to develop a program efficiently.

SUMMARY OF THE INVENTION

It is an object of the present invention to provide a development method and apparatus for efficiently developing a control program of a computer for a control unit, which is not provided with a program development-supporting tool for checking an operation of a newly prepared program.

According to the present invention, this object can be attained by a method for developing a control program, which comprises disposing a computer to be developed, which constitutes a control unit for controlling an object of control, and a development computer provided with a program development-supporting tool for checking an operation of a new control program written in a high-level language, executing the new control program written in the high-level language for controlling the object of control by the development computer, outputting the result of processing by the development computer into the computer to be developed, and executing the control by the computer to be developed based on the new control program.

More specifically, a new control program is prepared in a high-level language, this new control program is executed by the development computer provided with the program development-supporting tool instead of the computer to be developed, and the result of the execution is output to the development computer, whereby the development computer is caused to act as if processing based on the new control program were performed by the computer to be developed.

If an interface computer, provided with RAM, in which the result of processing of the development computer is written, and RAM, in which the result of processing of the computer to be developed is written, is disposed between the computer to be developed and the development computer so that the processing results of the respective computers are stored in these RAM's of the interface computer and one computer reads out the processing result of the other computer from the corresponding RAM, a good real-time characteristic can be maintained in the transfer of data between the development computer and the computer to be developed.

If, when the computer to be developed makes access to a specific address of RAM and rewrites the content thereof, the development computer reads in the rewritten content and performs computer processing based on the new control program and the processing result is output into the computer to be developed, the processing based on the newly developed program can be executed white the content of the processing executed by the computer to be developed is being grasped by the development computer.

Furthermore, if an interface computer, provided with RAM, in which the result of processing of the development computer is written, and RAM, in which the result of processing of the computer to be developed is written, is disposed between the development computer and the computer to be developed, and if, when the development computer makes access to a specific address of the above-mentioned RAM, the interface computer transfers data of the development computer to the computer to be developed by interrupt processing and when the computer to be developed makes access to a specific address of the above-mentioned RAM, the interface computer transfers data of the computer to be developed to the development computer by interrupt processing, transfer of data between both the computers can be executed by interrupt processing. Therefore, high-speed transfer of data can be accomplished.

Moreover, according to the present invention, there is provided an apparatus for developing a control program, which comprises a computer to be developed, which constitutes a control unit for controlling an object of control, and a development computer provided with a program development-supporting tool for checking an operation of a new control program written in a high-level language, wherein a new control program written in the high-level language for control the object of control is executed by the development computer and the result of processing by the development computer is output to the computer to be developed, and the control based on the new control program is executed by the computer to be developed.

Since the operation of the program is checked by the program development supporting tool in the development computer, the new program is executed by this development computer to check the operation of the new control program and the result of processing based on the new control program is put out into the computer to be developed, whereby the control of the object of control, including the control of the newly developed portion, can be executed by the computer to be developed and it can be confirmed how the actual control is performed according to the new control program.

If an interface computer provided with RAM, in which the result of processing of the development computer is written, and RAM, in which the result of processing of the computer to be developed is written, is disposed between the computer to be developed and the development computer, so that transfer of data between both the computers through the above-mentioned RAM's, a real-time characteristic can be ensured for transfer of data.

Moreover, if there is adopted a structure in which when the computer to be developed accesses a specific address of RAM to rewrite the content thereof, the development computer reads in the rewritten content and performs compution processing based on the new control program and the result of this processing is output into the computer to be developed, processing by the control program built in the computer to be developed can be grasped by the developing computer and the new control program can be executed based on this information by the development computer. Furthermore, the operation timing of the control program of the development computer can be made synchronous with the operation timing of the computer to be developed.

Still further, if an interface computer provided with RAM, in which the result of processing of the development computer is written and RAM, in which the result of processing of the computer to be developed is written, is disposed between the computer to be developed and the development computer, and if a function of transferring data of the development computer to the computer to be developed by interrupt processing when the development computer accesses a specific address of the above-mentioned RAM and a function of transferring data of the computer to be developed to the development computer by interrupt processing when the computer to be developed makes access to a specific address of the above-mentioned RAM are given to this interface computer, transfer of data between both the computers can be performed at a high speed by interrupt processing, and reduction of the processing speed by distribution of processing into the development computer and the computer to be developed can be prevented.

Other objects and aspects of the present invention will become apparent from an embodiment described hereinafter with reference to the accompanying drawings.

DETAILED DESCRIPTION OF THE PREFERRED EMBODIMENT

Figure 1:
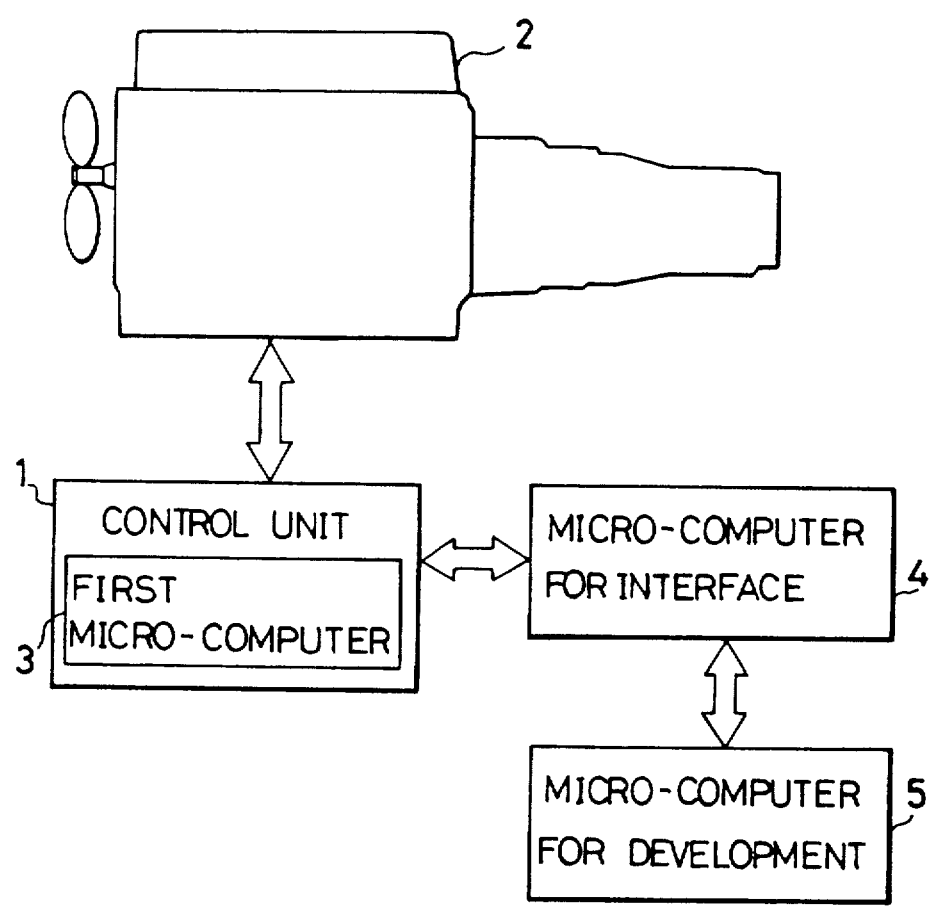
FIG. 1 is a block diagram illustrating the entire structure of one embodiment of the method and apparatus for developing a control program according to the present invention.

The structure of the apparatus for developing a control program according to the present invention is outlined in FIG. 1. An embodiment of the apparatus and method for developing a control program is illustrated in FIGS. 2 through 10.

Referring to FIG. 1, a control unit 1 is loaded as a product on a vehicle to control the fuel supply quantity or the ignition timing in an engine 2 as the object of control, and a first micro-computer 3 corresponding to the micro-computer whose control program is to be developed is built in the control unit 1. This first micro-computer 3 comprises CPU, ROM, RAM, I/O and A/D converter, and various programs for the control of the engine which are stored in the above-mentioned ROM.

Detection signals of various sensors for engine-driving conditions such as throttle valve opening degree TVO and engine revolution number N are input into this control unit 1. Based on these detection signals, the first micro-computer 3 determines control values of the fuel supply quantity, the ignition timing and the like and puts out control signals to a fuel injection valve, a power transistor or the like.

Incidentally, the control program set in ROM of the first micro-computer 3 built in the control unit 1 is one formed by translating a program constructed by an assembler language into a machine language, and not one formed by translating a program constructed by a high-level language into a machine language. The present invention is based on the assumption that a high-level language corresponding to the CPU of the first micro-computer 3 has not been developed, and the control program developed by the assembly language is set in ROM. In the present embodiment, a part of the control program developed by the assembler language and already built in the first micro-computer 3 is newly developed and changed and this program newly formed by using a high-level language is translated into a machine language and is executed by the control program-developing apparatus of the present invention, not by the first micro-computer, whereby the operation of the engine 2 is controlled and the synergistic test of softwares and hardwares is accomplished.

The control unit 1 at the stage of the product controls the engine 2 singly, but when a part of the control program in the first micro-computer 3 of the control unit 1 is changed and developed, as shown in the drawings, a development micro-computer 5 is connected through an interface micro-computer 4. In this development micro-computer 5, a new control program is executed and the result is output to the control unit 1 through the interface micro-computer 4, whereby the engine 2 is controlled based on the result of processing by the development micro-computer 5 and the result of processing in the first micro-computer 3.

The development micro-computer 5 executes the new program formed for the first micro-computer 3 instead of the first micro-computer 3. For the execution of the new program by the development micro-computer 5, a new program (source program) is formed with a high-level language by another micro-computer (host computer), and this new program is translated into machine language and then transported to the development micro-computer 5. Incidentally, a program development-assisting tool sufficient to find a bug in the program for the first micro-computer 3, for example, an emulator, is disposed in the above-mentioned micro-computer for forming a new program with a high-level language. Furthermore, a compiler for translating a high-level language into a machine language, such as C, FORTRAN or PASCAL, is disposed in the above-mentioned micro-computer. In the present embodiment, the development computer is constructed by the development micro-computer 5 and the above-mentioned micro-computer for forming a source program with a high-level language. Incidentally, there can be adopted a modification in which a source program is formed with a high-level language in the development computer, the program is translated into a machine language by a compiler, and the program is executed after debugging by an accessory program development-supporting tool.

The development micro-computer 5 and the interface micro-computer 4 will now be described in detail with reference to FIGS. 2 and 3.

Figure 2:
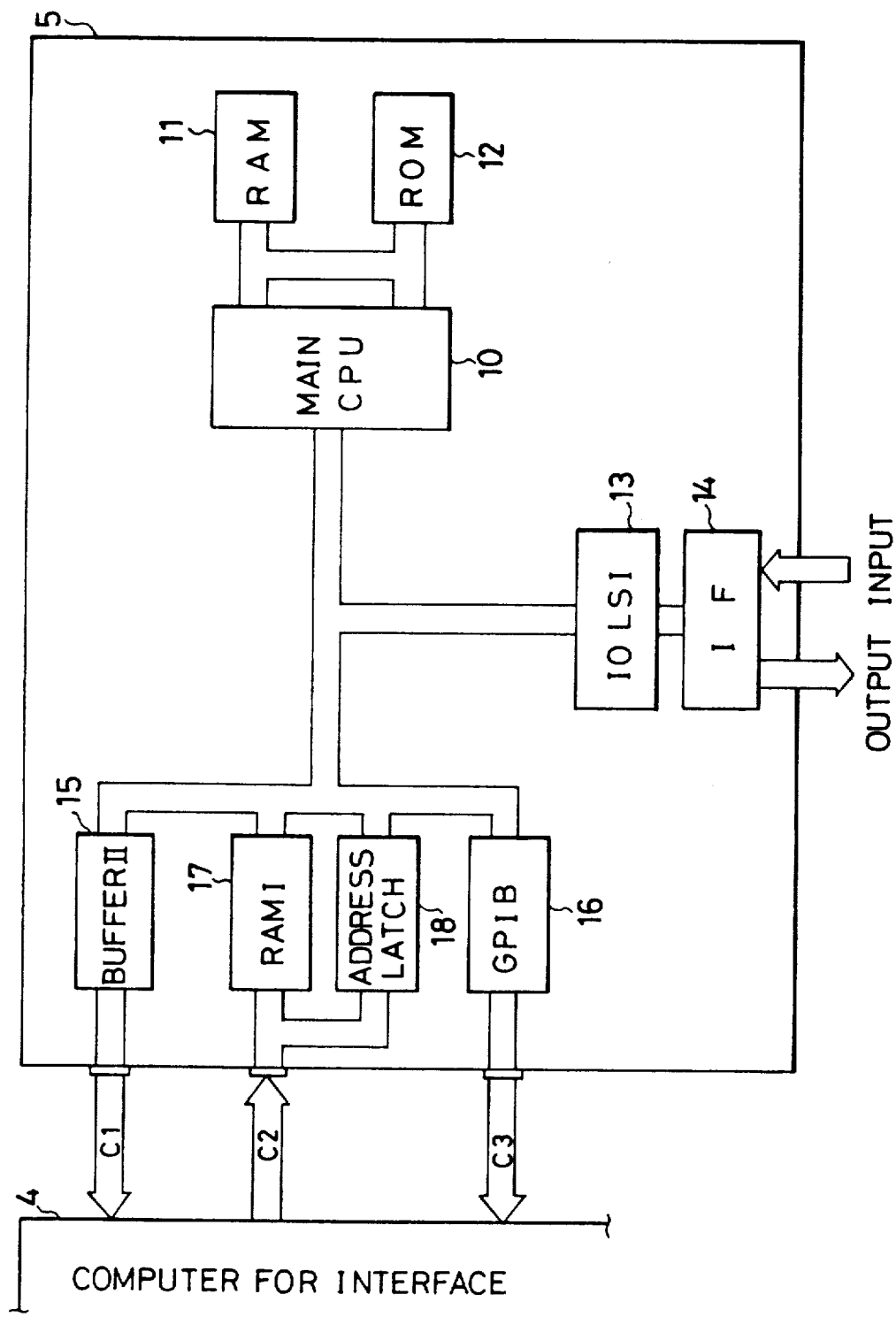
FIG. 2 is a block diagram illustrating the structure of the development computer shown in FIG. 1.

As shown in FIG. 2, the development micro-computer 5 comprises in general CPU 10, RAM 11, ROM 12, I/OLSI 13 and I/F 14. The development micro-computer 5 further comprises buffer II 15 used for sending data to an interface device 4, a general-purpose interface (GPIB) 16, RAMI 17 for storing RAM data transmitted from the interface micro-computer 4, and an address latch 18 for latching an access address of this RAMI 17. A man-machine interface such as a keyboard or a monitor is connected to the above-mentioned I/F 14.

Figure 3:
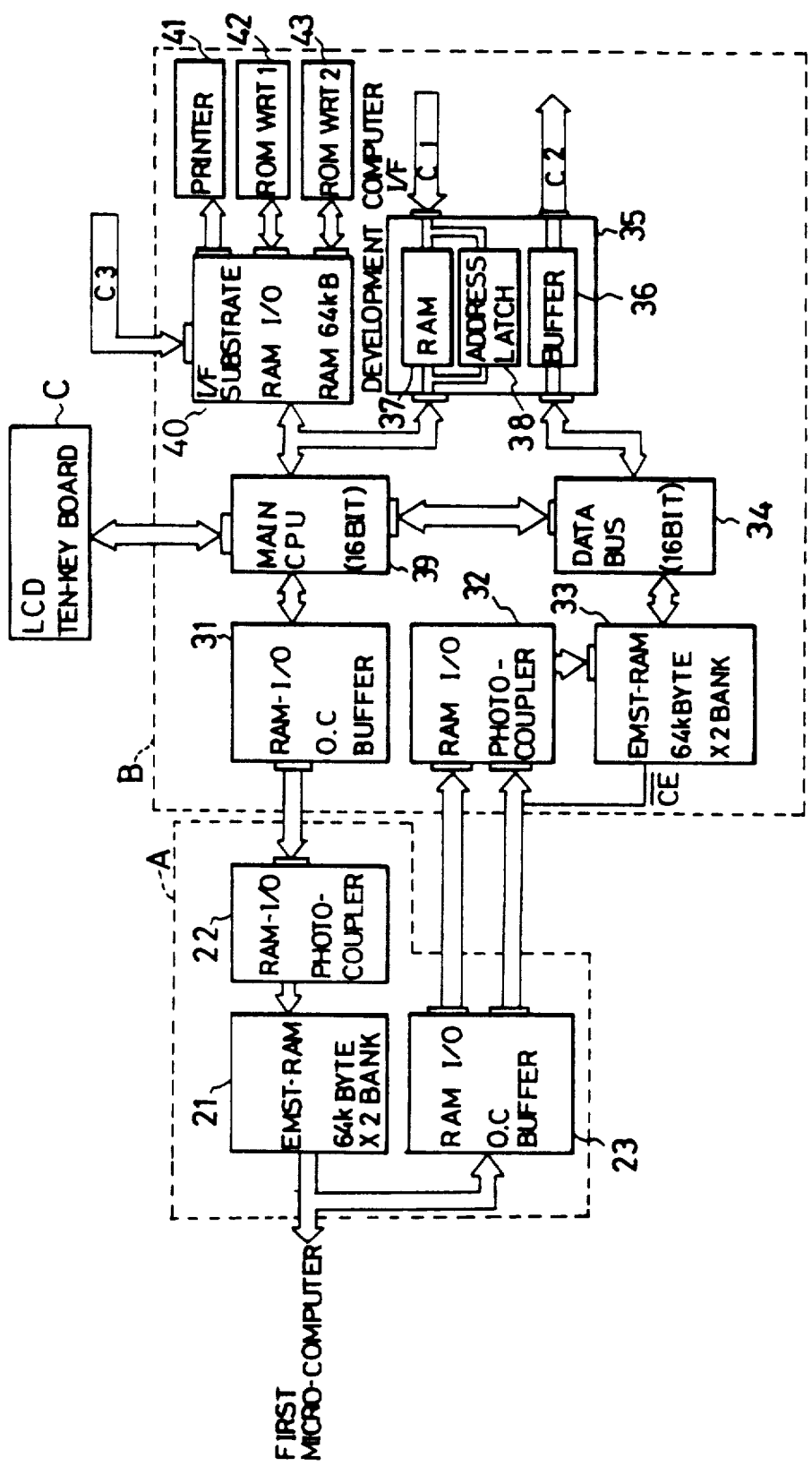
FIG. 3 is a block diagram illustrating the structure of the interface computer shown in FIG. 1.

As shown in FIG. 3, the interface micro-computer 4 comprises a probe box A, a body B and control box C.

The probe box A is an interface connected to the first micro-computer 3 of the control unit 1, which comprises emulation RAM (EMST-RAM; 2-bank structure for each 64 k-bytes) 21, for reading data from the developing micro-computer into the first micro-computer 3, a photocoupler 22 acting as RAM-I/O for an access to this emulation RAM 21 from the body B, and an optical character buffer 23 for emitting RAM data of the first micro-computer 3 to the body B.

The body B grounded via the probe box A and a cable comprises an optical character buffer 31 constituting I/O of the emulation RAM 21 together with the photocoupler 22, and a photocoupler 32 for converting signals from the optical character buffer 23, which constitutes RAM-I/O together with the buffer 23.

Emulation RAM (EMST-RAM) 33 for reading data from the first micro-computer 3 into the development micro-computer 5 is connected to the photocoupler 32. This emulation RAM 33 has a 2-bank structure for every 64 k-bytes and a storage capacity of 64 k-bytes × 2 for setting a flag at every address of a work length of 8 bits.

The emulation RAM 33 is controlled by data bus CPU 34, and RAM data of the emulation RAM 33 read out at the data bus CPU 34 i s put out i n to the development micro-computer 5 through a buffer 36 constituting a development computer interface 35 (parallel signal line C2) and is stored in RAMI 17 of the development micro-computer 5.

The development computer interface 35 comprises RAM 37 for storing ROM data emitted through the buffer II 15 of the development micro-computer 5 and a parallel signal line C1, and an address latch 38 for latching an access address of this RAM 37, which are arranged so that the contents of RAM 37 and address latch 38 are read out a main CPU 39. The main CPU 39 is constructed so that the main CPU 39 can communicate with the above-mentioned data bus CPU 34 and parallel signals can be transferred between the main CPU 39 and the control unit box C as the man-machine interface.

The data output through the buffer II 15 of the development micro-computer 5 is put into an interface substrate 40 of the interface micro-computer 4 through a parallel signal line C3. A printer 41 and ROM writers 41 and 42 are connected to this interface substrate 40 controlled by the main CPU 39.

A liquid crystal device (LCD) and a ten-key board are arranged in the control box C.

In the above-mentioned structure, if the interface micro-computer 4 is connected to the first micro-computer 3 of the control unit 1, CPU of the first micro-computer 3, like installed RAM, makes access to the above-mentioned emulation RAM's 21 and 33 and puts out RAM data of the first micro-computer 3 to the development micro-computer 5 in parallel. Furthermore, CPU of the first micro-computer 3 emits the result of processing of the development micro-computer 5 into the first micro-computer 3.

Accordingly, if any additional hardware is attached to the first micro-computer 3 or development micro-computer 5, parallel data communication can be performed at a high speed by the interface micro-computer 4, and furthermore, any debugging hardware need not be added to the first micro-computer 3.

Figure 4:
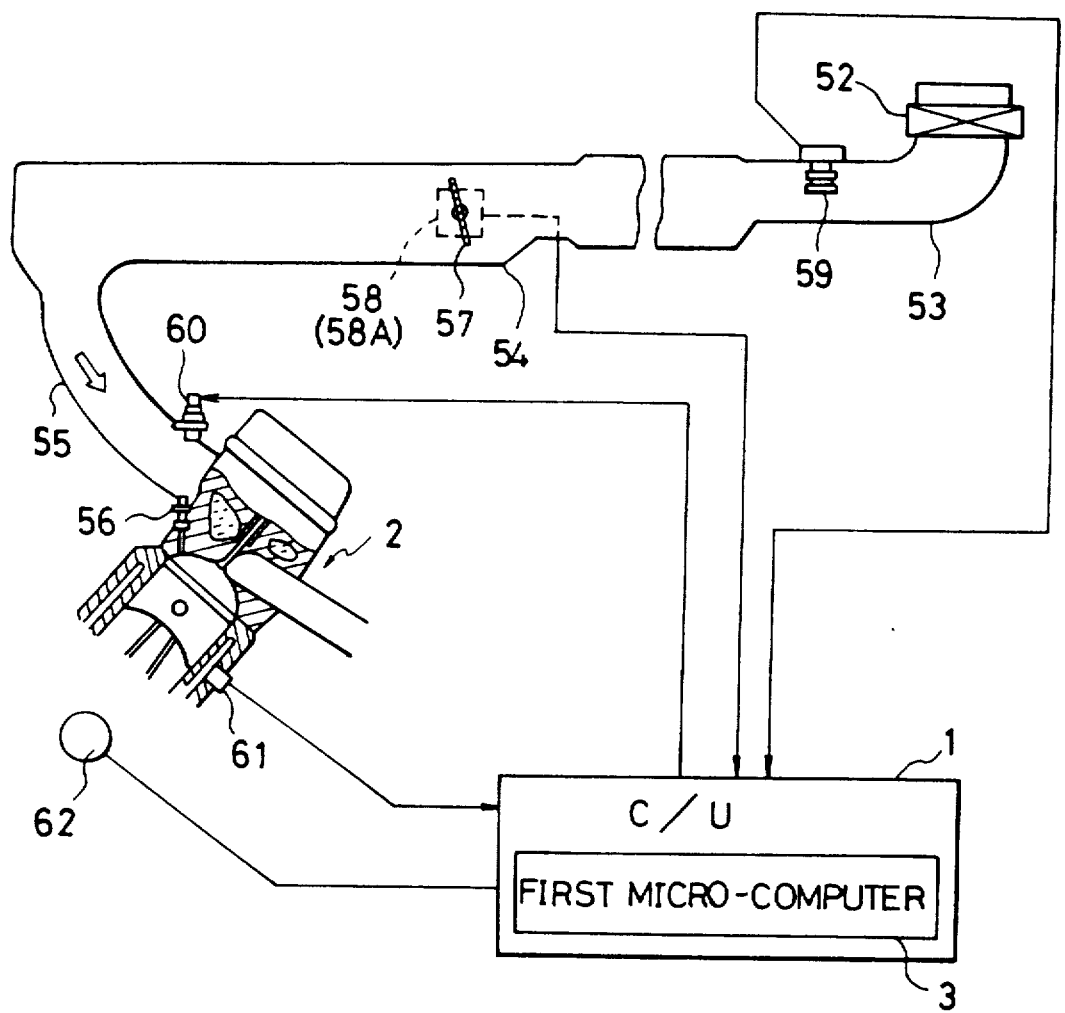
FIG. 4 is a system diagram of an engine which is an object of control in the above-mentioned embodiment.

An example of the development of a program by this control program-developing apparatus will now be described. An extraction of the construction of the engine 2 controlled by the control unit 1 is illustrated in FIG. 4.

Air is sucked into the engine 2 through an air cleaner 52, a suction duct 53, a throttle chamber 54 and a suction manifold 55. A throttle valve 57 for variably controlling the open area of the throttle chamber 54 in cooperation with an accelerator pedal not shown in the drawings is disposed in the throttle chamber 54 to control the suction air flow quantity Q.

A potentiometer for detecting the opening degree TVO of the throttle valve 57 and a throttle sensor 58 including an idle switch 58A which is turned on when the throttle valve 57 is at a wholly closed position (idle position) are arranged in the throttle valve 57.

An air flow meter 59 for detecting the suction air flow quantity Q of the engine 2 is arranged in the suction duct upstream of the throttle valve 57 to put out a voltage signal Us corresponding to the suction air flow quantity Q.

An electromagnetic fuel injection valve 60 for each cylinder is arranged at each branch of the suction manifold 55 located downstream of the throttle valve 57. The fuel injection valve 60 is driven and opened by a driving pulse signal emitted at a timing synchronous with the revolution of the engine from the control unit 1 in order to inject and supply a fuel fed under pressure from a fuel pump not shown in the drawings and having the pressure adjusted to a predetermined level by a pressure regulator, into the suction manifold 55.

Furthermore, a water temperature sensor 61 for detecting the temperature Tw of cooling water in a cooling jacket of the engine 2 is disposed, and an ignition plug 56 is exposed to a combustion chamber of each cylinder.

The control unit 1 detects the engine revolution number N by counting unit crank angle signals POS emitted synchronously with the revolution of the engine from a crank angle sensor 62 for a predetermined time or measuring the frequency of reference crank angle signals REF emitted at every crank angle position.

The control unit 1 computes the fuel injection quantity Ti based on detection signals from the above-mentioned sensors and emits a driving pulse signal having a pulse width corresponding to the fuel injection quantity Ti to each fuel injection valve 60 at a predetermined timing to control the supply of the fuel into each cylinder.

The computation control of the fuel injection quantity Ti conducted by the first micro-computer 3 of the control unit 1 will now be described in detail with reference to programs illustrated in flow charts of FIGS. 5 and 6. The programs shown in the flow charts of FIGS. 5 and 6 are those preliminarily developed and formed by an assembly language and stored in ROM of the first micro-computer 3.

Figure 5:
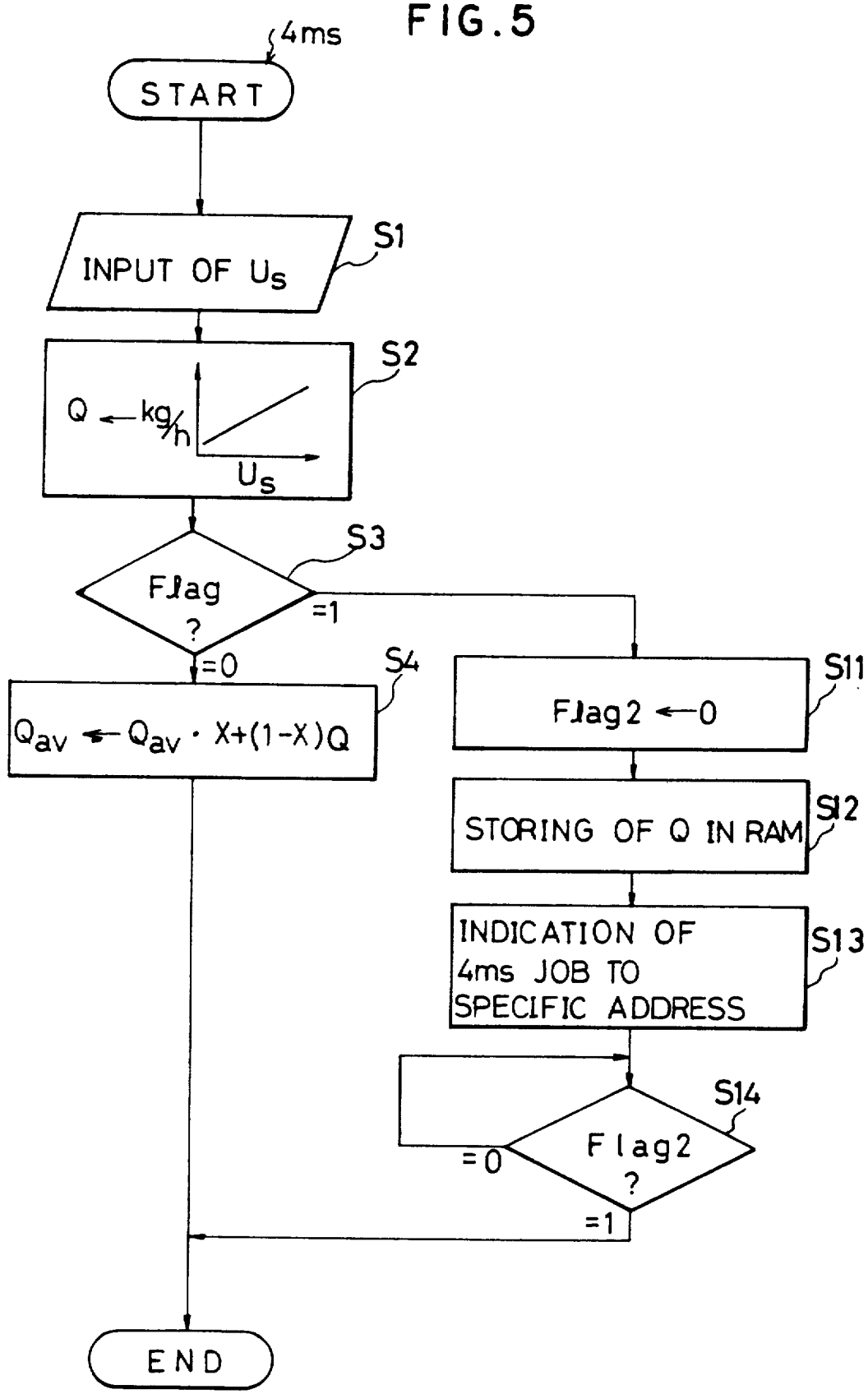
FIG. 5 shows a flow chart of the calculation of an average air flow quantity according to an embodiment of the invention.
Figure 6:
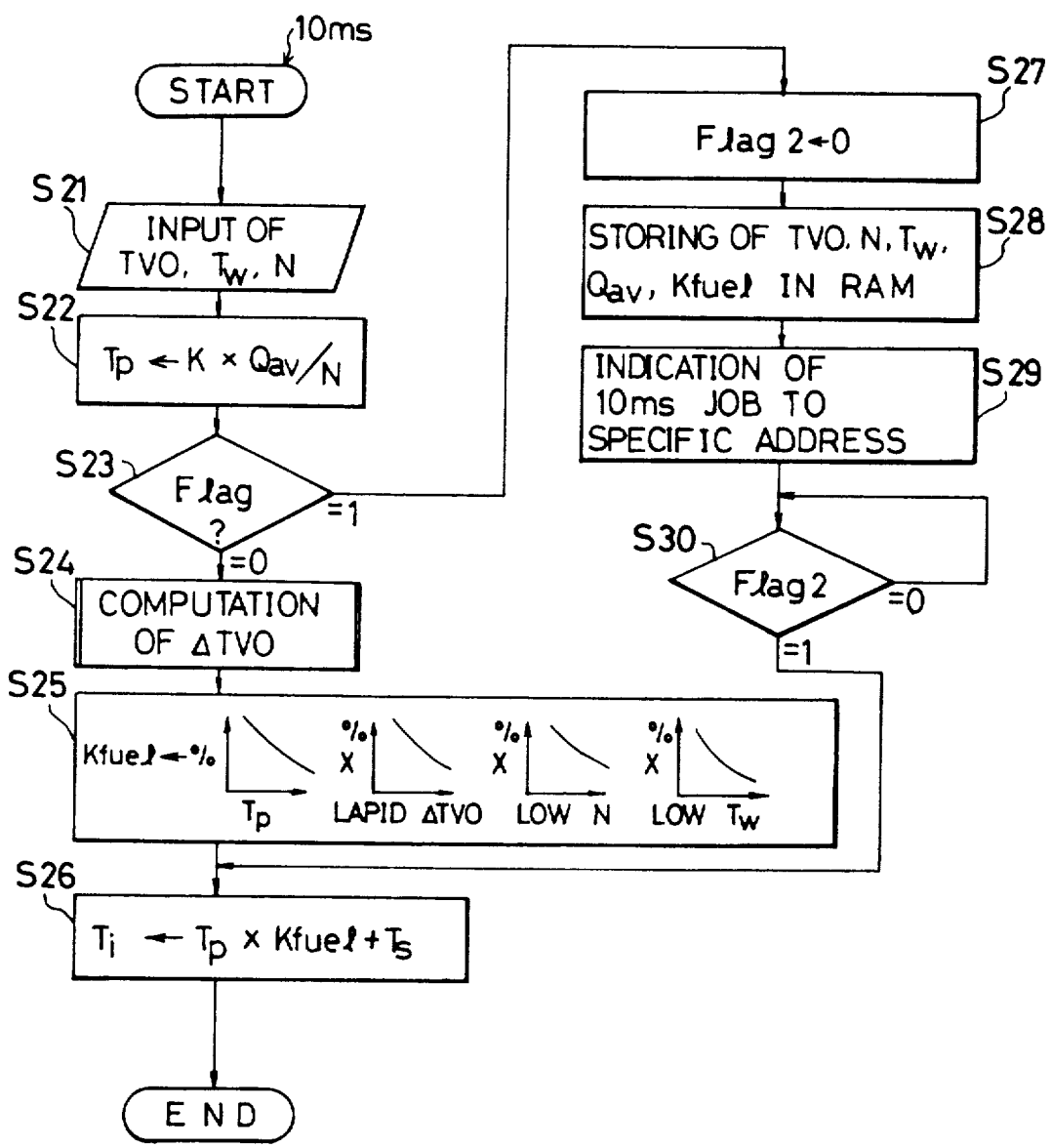
FIG. 6 shows a flow chart of the calculation of a fuel injection quantity according to an embodiment of the invention.

The program shown in the flow chart of FIG. 5 is executed at every 4 ms, and the weighted mean suction air flow quantity Qav is computed according to this program.

At step 1 (S1 in the drawings; subsequent steps are similarly indicated in the drawings), a voltage signal Us corresponding to the suction air flow quantity Q is received from the air flow meter 59. At next step 2, the suction air flow quantity Q corresponding to the voltage signal Us received at step 1 is retrieved and determined from a preliminarily set map.

At step 3, a flag Flag at which 1 is set at the time of development of a control program is judged. At the control by the control unit 1 atone, zero is set at the above-mentioned flag Flag, and therefore, normally, the routine goes into step 4 from step 3.

At step 4, based on the suction air flow quantity Q obtained at step 2 at the present execution and the weighted mean suction air flow quantity Qav obtained at step 4 at the preceding execution, a new weighted mean suction air flow quantity Qav is calculated by using a weighting constant X according to the following formula:

$$Qav \leftarrow X \cdot Qav + (1-X) \cdot Q$$

The program shown in the flow chart of FIG. 6 is executed at every 10 ms, and the fuel injection quantity Ti is computed according to this program.

At step 21, the throttle valve opening degree TVO detected by the throttle sensor 58, the cooling water temperature Tw detected by the water temperature sensor 61 and the engine revolution number N calculated based on the detection signal from the crank angle sensor 62 are received.

As step 22, the basic fuel injection quantity Tp is calculated according to the following formula:

$$Tp \leftarrow K \times Qav/N$$

wherein K is a constant and Qav is the weighted mean suction air flow quantity calculated according to the flow chart of FIG. 5.

At next step 23, the judgement of a flag Flag is performed in the same manner as conducted in the flow chart of FIG. 5. Also in this flow chart, in the normal state, it is judged that zero is set at the flag Flag, and the routine goes into step 24.

At step 24, the change ratio $\Delta TVO$ of the throttle valve opening degree TVO per unit time is calculated.

At step 25, coefficients corresponding to the basic fuel injection quantity Tp, throttle valve opening degree change ratio $\Delta TVO$, engine revolution number N and cooling water temperature Tw are retrieved and determined from preliminarily set maps, and a fuel correction coefficient Kfuel is determined by multiplying these coefficients.

At step 26, a final fuel injection quantity Ti ($\leftarrow Tp \times Kfuel + Ts$) is calculated from the fuel correction coefficient calculated at step 25 and a correction component Ts for correcting the change of the effective open time of the fuel injection valve 60 according to the change of the battery voltage.

In the case where new programs are developed for improving the program for computing the weighted mean of the suction air flow quantity Q in the flow chart of FIG. 5 and the program for computing the fuel correction coefficiency Kfuel in the flow chart of FIG. 6, it is necessary that a new control program should be formed and this new control program should be executed to test the driving controllability of the engine 2.

Then, the test result of the control program is fed back and improved to determine a control program of the final specification. If it is i n tended to perform this operation only by the control unit 1, it is necessary to set a program newly formed by an assembler language at ROM of the first micro-computer 3, check the operation of this program and modify and develop the control program, which is complicated. However, according to the control program-developing apparatus of the present embodiment, instead of the first micro-computer 3, the development micro-computer 5 executes a program formed by translating a program newly developed with a high-level language into a machine language, and for this purpose, a new control program is prepared with a high-level language, whereby development of a software can be performed at a high efficiency.

The function of the control program-developing apparatus will now be described with reference to a program for calculating the weighted mean of the suction air flow quantity Q and a program for calculating the fuel correction coefficient Kfuel as examples.

In the case where a new control program formed with a high-level language by the development micro-computer 5 for improving a part of the control program of the first micro-computer 3 is executed and this new control program is used for the control of the engine, 1 is set at flags Flag in the flow charts of the FIGS. 5 and 6.

Accordingly, at the flag-judging step in each of the flow charts of FIGS. 5 and 6, it is judged that 1 is set at the flag Flag, and therefore, in each flow chart, the calculation of the weighted mean of the suction air flow quantity Q and the calculation of the fuel correction coefficient Kfuel are not performed, but the following control is executed.

In case of the flow chart of FIG. 5, when it is judged at step 3 that the flag Flag is set at 1, the routine goes into step 11, and zero is set at a flag Flag 2 for judging whether or not the result of the computation of the weighted mean suction flow quantity Qav based on the new control program from the development computer 5 is returned.

At step 12, the data of the suction air flow quantity Q obtained at step 2 is stored at a predetermined address position of installed RAM. At this point, the emulation RAM 33 of the body B of the interface micro-computer 4 is similarly accessed to store the data of the suction air flow quantity Q.

One specific address Adr(i) is preliminarily set as the address at which the suction air flow quantity Q is stored, and when the specific address Adr(i) of the emulation RAM 33 is accessed, 1 is set at a flag FAdr(i) corresponding to the specific address Adr(i). Incidentally, the storage capacity for the flag FAdr(i) is secured at 64 k-bits×2.

Incidentally, when chip enable $\overline{CE}$ of the first micro-computer 3 is at a low level, the writing operation is not carried out in the first micro-computer 3 and the data level of installed RAM of the first micro-computer 3 is the same as the data level of the emulation RAM 33, and therefore, when chip enable $\overline{CE}$ rises to a high level from the low level, bank change is effected in the emulation RAM 33.

When 1 is set at the above-mentioned flag FAdr(i), the content of the specific Adr(i), that is, the data of the suction air flow quantity Q, is fed to the buffer 36 of the development computer interface 35, and this data of the suction air flow quantity Q is stored in RAM 17 of the development micro-computer 5 through this buffer 36. In this state, the data of the suction air flow quantity Q can be read out by CPU 10 of the development micro-computer 5.

Figure 7:
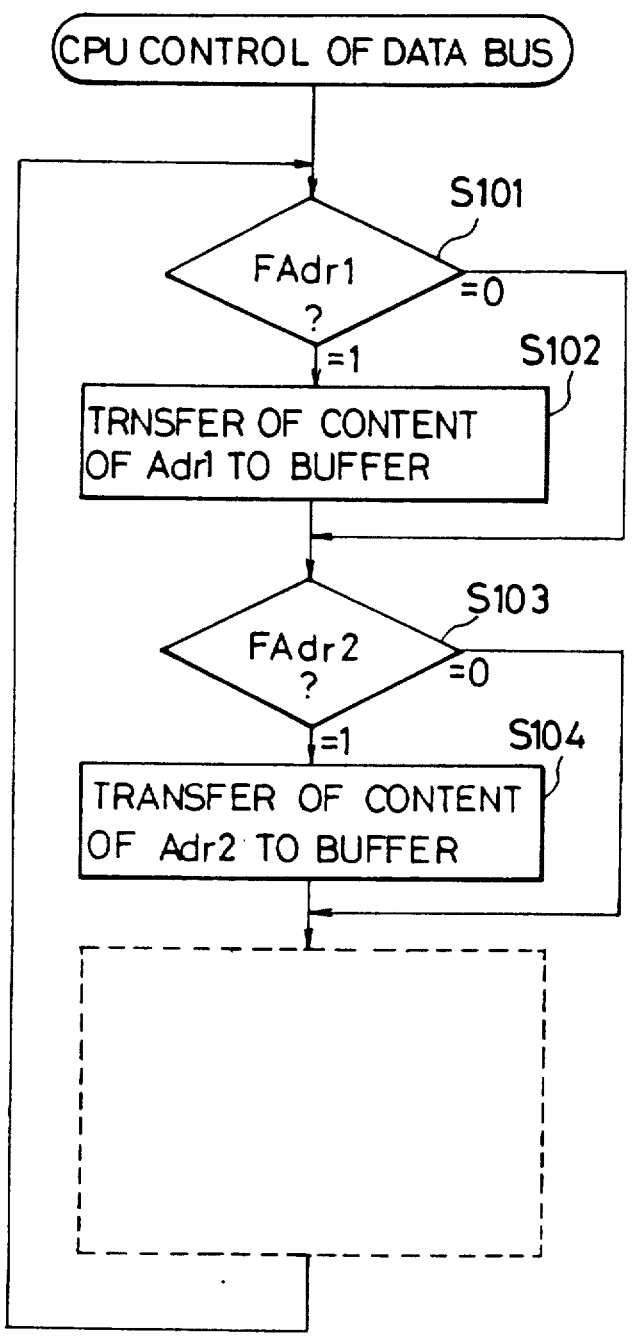
FIG. 7 shows a flow chart for the transfer of the RAM data from one microcomputer to a second microcomputer according to an embodiment of the invention.

The control of transfer of the RAM data of the first micro-computer 3 to the development micro-computer 5, which is executed in the data bus CPU 34, is shown in the flow chart of FIG. 7.

It is judged whether the flag FAdr(i) corresponding to the preliminarily set specific address Adr(i) is 1 or zero (steps 101, 103, ... ). When the flag FAdr(i) is at 1, this indicates that the specific address Adr(i) is accessed by the first micro-computer 3, and therefore, in order to inform the development micro-computer 5 of this processing state in the first micro-computer 3, the content of the accessed specific address Adr(i) is put out into the buffer 36 (steps 102, 104, ... ).

The content of the specific address Adr(i) put out through the buffer 36 of the interface computer 4 is stored at RAMI 17 of the development computer 5, and at this point, the specific address Adr(i) is latched by an address latch 18.

This control is effected for each specific address Adr(i), and at least the RAM data concerning the newly developed program is transferred to the development micro-computer 3 every time the first micro-computer 3 makes access and performs rewriting, so that the development micro-computer 5 can grasp the processing state of the first micro-computer 3.

Referring to the flow chart of FIG. 5 illustrating the control executed in the first micro-computer 3 again, when storing of the suction air flow quantity Q in RAM is executed at step 12, at next step 13, a code indicating the execution of 4 ms JOB (the program of calculating the weighted mean of the suction flow quantity) is stored at the specific address Adr(i) of RAM.

At next step 14, the judgement is repeated until the flag Flag2 in which zero is set at step 11 becomes 1. When this flag Flag2 becomes 1, the present program is ended.

Setting of 1 at the flag Flag2 is effected in the following manner.

When the code indicating the execution of 4 ms JOB stored at step 13, in the same manner as at the storing of the suction air flow quantity Q, a specific address of the emulation RAM 33 is accessed and by this access, 1 is set at the corresponding flag FAdr(i), and the code of the execution of 4 ms JOB is transferred to RAMI 17 of the development micro-computer 5 in parallel through the buffer 36. At this point, the specific address Adr(i) in which the code of the execution of 4 ms JOB is stored is latched by the address latch 18.

If the specific address Adr(i) latched at the address latch 18 is the specific address in which the code of the execution of 4 ms JOB or a code of the execution of 10 ms JOB described hereinafter is stored, CPU 10 of the development micro-computer 5 executes a program shown in the flow chart of FIG. 8 to be interrupt-executed with this latching of the specific address being as a timing, and the weighted mean suction flow quantity Q is calculated according to a newly developed program (change program formed with a high-level language) instead of the program at step 4 in the flow chart of FIG. 5. Finally, 1 is set at the above-mentioned flag Flag2.

Namely, when the development micro-computer 5 calculates the weighted mean suction air flow quantity Qav instead of the first micro-computer 3, 1 is set at the above-mentioned flag Flag2, and when the calculation by the development micro-computer 5 is terminated, the routine of the flow chart of FIG. 5 is ended.

The weighted mean suction air flow quantity Qav computed by the development micro-computer 5 and the content of the flag Flag2 at which 1 is set are emitted to the buffer II 15 and are stored in RAM 37 of the development computer interface 35. When the specific address Adr(i) in which the weighted mean suction air flow quantity Qav and the contents of the flag Flag2 are stored is latched by the address latch 38, the main CPU 39 detects the return of the result of calculation of the suction air flow quantity Qav from the development micro-computer 5. The main CPU then transfers in parallel the weighted mean suction air flow quantity Qav and the data of the flag Flag2 to the emulation RAM 21 of the probe box A accessed by the first micro-computer 3 by interrupt processing (see the flow chart of FIG. 9) executed with the latching of the specific address being as an execution timing. Incidentally, the transfer of the data to the emulation RAM 21 is effected to the bank on the side not accessed by the first micro-computer 3.

More specifically, when the preliminarily set specific address is accessed, the parallel transfer of the data to the first micro-computer 3 as the micro-computer to be developed from the development micro-computer 5 (see FIG. 9) is effected by interrupt processing novel processing. Simultaneously, novel processing for conversion to the first micro-computer 3 (see FIG. 8) is effected by interrupt processing. Accordingly, a high-speed processability comparable to that attained when the computation is carried out by the first micro-computer 3 atone can be ensured.

A similar control is carried out also according to the program shown in the flow chart of FIG. 6. More specifically, at the start of the program when it is judged at step 23 that the flag Flag is at 1, the routine goes into step 27, and 1 is set at the flag Flag2 and the return of the result of the computation at the development micro-computer 5 is waited for, white various data (TVO, N Tw, Qav and precedent Kfuel) concerning the fuel correction coefficient Kfuel are stored at RAM at step 28. By this control of storing at RAM, various data concerning the fuel correction coefficient Kfuel are transferred in parallel to the emulation RAM 33 and the RAMI 17 of the development micro-computer 5 through the buffer 36.

At next step 29, a code indicating the execution of 10 ms JOB (job of computing the fuel injection quantity) is stored in a specific address. By this storing of the code of the execution of 10 ms JOB in RAM, the program shown in the flow chart of FIG. 8 is interrupt-executed in the developing micro-computer 5 with the latching of the address being as an execution timing and the fuel correction coefficient Kfuel is computed according to the new development program instead of the operations of steps 24 and 25. If the fuel correction coefficient Kfuel is computed according to the novel program by the development micro-computer 5, 1 is set at the flag Flag2, and the routine of the flow chart of FIG. 6 for the processing to be performed by the first micro-computer 3 is ended.

The newly developed program (new control program) for computing the weighted mean suction air flow quantity Qav and the fuel correction coefficient Kfuel, to be processed by the development micro-computer 5, will now be described in detail. Incidentally, this newly developed control program is one newly formed by using a high-level language, and this program is advantageous over the program formed by using an assembler language in that the burden on a programmer is reduced and the program can be developed efficiently white inhibiting generation of a bug.

Figure 8:
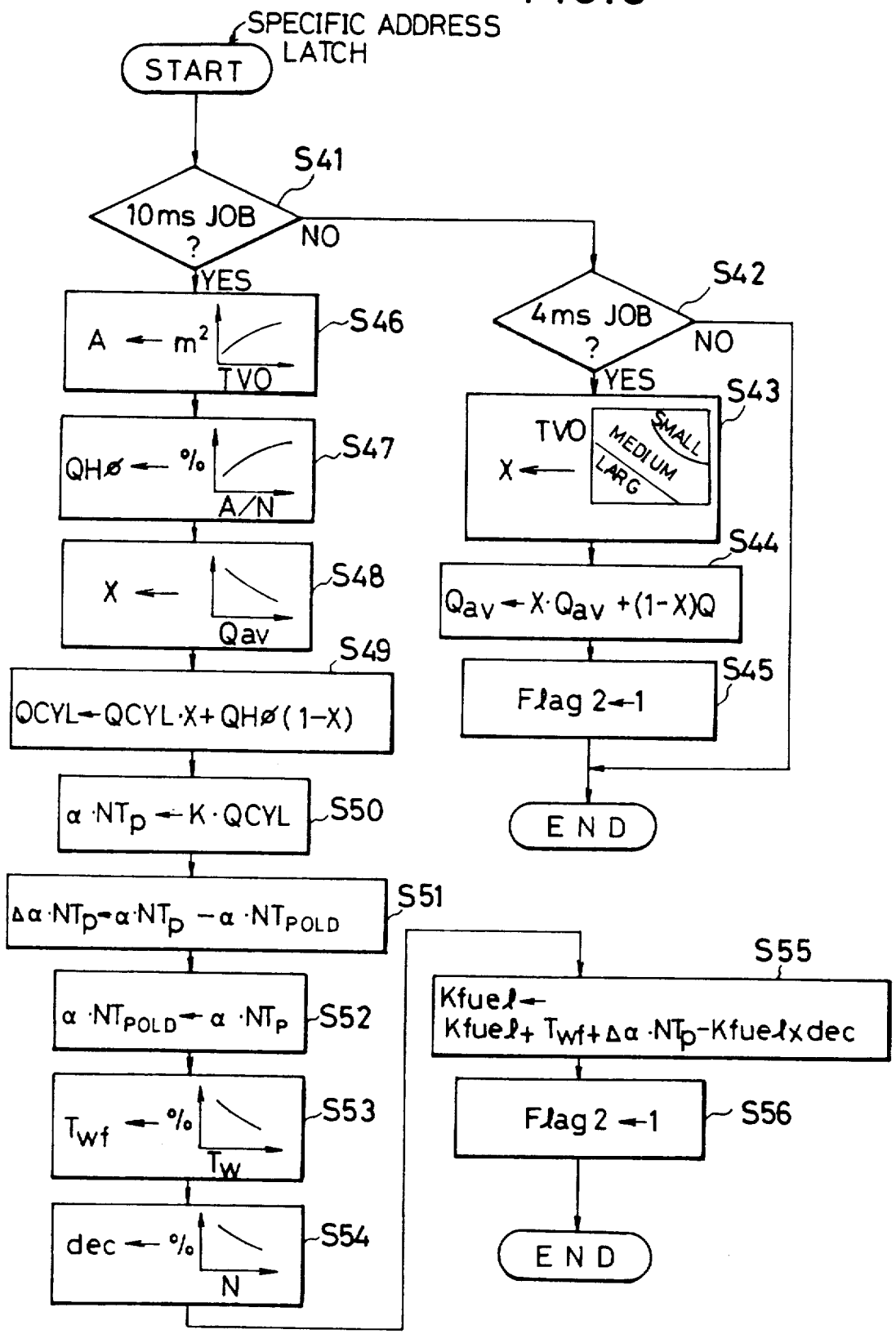
FIG. 8 shows a novel processing flow chart according to an embodiment of the invention.

When the code of the execution of the 4 ms JOB or the 10 ms JOB is stored at a specific address, this specific address is latched by the address latch 18, and processing of the flow chart of FIG. 8 is executed.

At step 41, it is judged whether or not the code stored at the specific address indicates the execution of 10 ms JOB. When the execution of 10 ms JOB is not indicated, the routine goes into step 42 and it is judged whether or not the execution of 4 ms JOB is indicated.

If it is judged at step 42 that the code indicates the execution of 4 ms JOB, the following program of computing the weighted mean suction air flow quantity Qav is executed.

At step 43, the corresponding loading weight X is retrieved and determined from a map where the loading weight used for computing the weighted mean is set for each of driving regions sectioned by the engine revolution number N and the basic fuel injection quantity Tp.

Incidentally, in the present embodiment, three kinds of loading weights X, that is, large, medium and small weights, are used, and the results of processing of the first micro-computer 3 taken into RAMI 17 through the emulation RAM 33 are used as data of the engine revolution number N and basic fuel injection quantity Tp as the retrieval parameters.

At next step 44, the weighted mean suction air flow quantity Qav is computed by using the loading weight X retrieved and determined at step 43 according to the following formula:

$$Qav \leftarrow X \cdot Qav + (1-X) \cdot Q$$

This computation formula is the same as the formula used at step 4 in the flow chart of FIG. 5 showing the program to be processed by the first micro-computer 3, but the processing of changing the loading weight X according to the driving region is newly added. Incidentally, the data of the newest suction air flow quantity Q used for the above computation formula is the data stored at RAM by the processing executed at step 12.

If the weighted mean suction air flow quantity Qav is computed by the processing different from the processing in the first micro-computer 3, 1 is set at the flag Flag2 and the data of this flag Flag2 and the data of the weighted mean suction air flow quantity Qav are put out into the buffer II 15, whereby the termination of the computation of the weighted mean suction air flow quantity Qav in the development micro-computer 5 is detected by the first micro-computer 3 through the RAM 37 and emulation RAM 21.

If it is judged at step 41 that the execution of the 10 ms JOB is indicated, the routine goes into step 46, and the open area A of the throttle chamber 54 is retrieved and determined from a map based on the throttle valve opening degree TVO.

At next step 47, the basic volume efficiency $QH\phi$ is retrieved and determined from a preliminarily set map based on the value obtained by dividing the open area A determined at step 46 by the engine revolution number N.

At step 48, the loading weight x is retrieved and determined from a preliminarily set map based on the weighted mean suction air flow quantity Qav.

At step 49, the weighted mean of the basic volume efficiency $QH\phi$ determined at step 47 and the volume efficiency QCYL determined at the precedent execution is calculated by using the loading weight x determined at step 48 to determined a new volume efficiency QCYL according to the following formula:

$$QCYL \leftarrow QCYL \cdot x + QH\phi(1-X).$$

At step 50, the basic fuel injection quantity $\alpha.NTp$ is calculated by multiplying the volume efficiency QCYL determined at step 49 by a constant K. This basic fuel injection quantity $\alpha.NTp$ is the basic fuel injection quantity corresponding to the suction air quantity estimated from the open are A and engine revolution number N.

At step 51, the difference $\Delta\alpha.NTp$ between the newly computed basic fuel injection quantity $\alpha.NTp$ and the $\alpha.NTpold$ value computed at the precedent execution is computed. This $\Delta\alpha.NTp$ is the data indicating the transient driving state of the engine.

At step 52, the newest basic fuel injection quantity $\alpha.NTp$ computed at step 50 at the present execution is set for the precedent value $\alpha.NTpold$, which is to be used for the computation at step 51 at the next execution.

At step 53, the correction coefficient Twf is retrieved and determined from a map based on the cooling water temperature Tw, and at next step 54, the decrease characteristic value dec of the fuel correction coefficient Kfuel is retrieved and determined from a map based on the engine revolution number N.

At step 55, the fuel correction coefficient Kfuel is computed from the precedent fuel correction coefficient Kfuel and the values of $\Delta\alpha.NTp$, Twf and dec according to the following formula:

$$Kfuel \leftarrow Kfuel + Twf \times \Delta\alpha.NTp - Kfuel \times dec.$$

The fuel correction coefficient Kfuel×dec computed according to the method different from the processing performed in the first micro-computer 3, and at next step 56, 1 is set at the flag Flag2 and the first micro-computer 3 is caused to detect the computation of the fuel correction coefficient Kfuel by the development microcomputer 5. Simultaneously, in the first micro-computer 3, the fuel injection quantity Ti is computed by using the fuel correction coefficient Kfuel computed by the development micro-computer 3.

Incidentally, as pointed out hereinbefore, when the specific address of the emulation RAM 33 is accessed by the first micro-computer 3, the data bus CPU 34 outputs the content stored at this address to the buffer 36. However, it is necessary to preliminarily determine what address should be used as the specific address, the content of which is to be put out into the buffer 36. Setting of this specific address is carried out as shown in the flow chart of FIG. 10.

Figure 10:
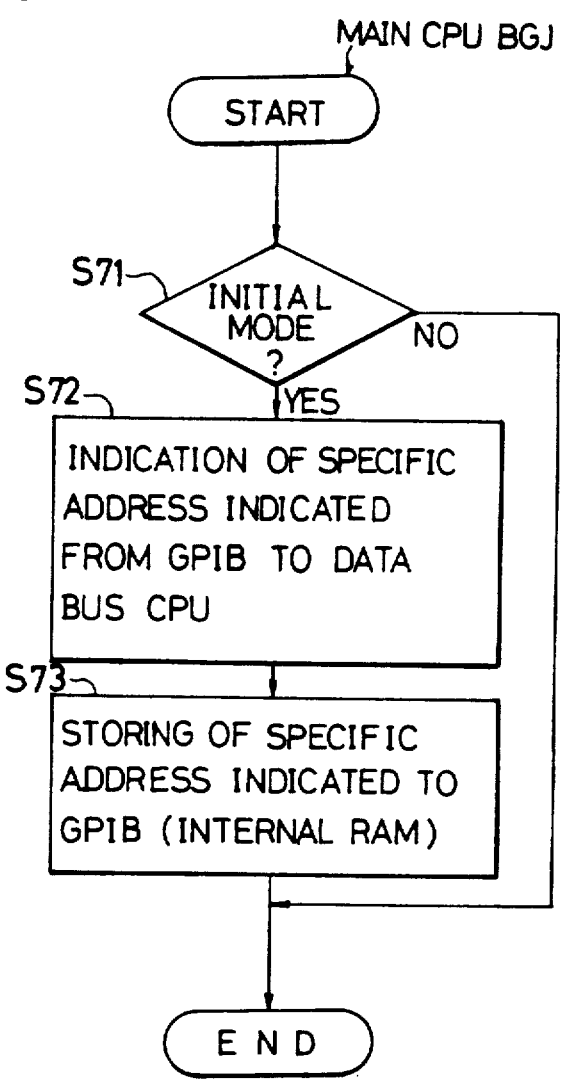
FIG. 10 shows a flow chart for preliminary setting of a specific address according to a specific embodiment of the invention.

The program shown in the flow chart of FIG. 10 represents the background processing to be conducted by main CPU 39 of the interface micro-computer 4. At step 71, it is judged whether or not the main CPU is in the initial mode.

If it is judged that the main CPU 39 is in the initial mode, the routine goes into step 72, the specific address indicated from the development micro-computer 5 through GPIB 16 and interface substrate 40 is indicated to the data bus CPU 34.

Figure 9:
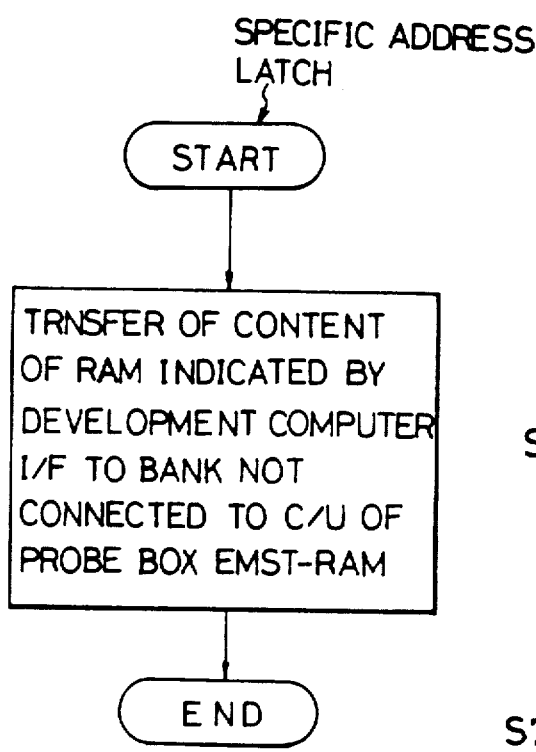
FIG. 9 shows a flow chart for the parallel transfer of data between microprocessors according to an embodiment of the invention.

At step 73, the data bus CPU 34, to which the specific address has been indicated, stores this specific address in installed RAM thereof. By comparing the stored specific address with the address practically accessed at the emulation RAM 33, it is judged whether or not the accessed address is the specific address. If the accessed address is the specific address, processings of the programs shown in the flow charts of FIGS. 8 and 9 are interrupt-executed to effect the transfer of data and the execution of the newly developed control program.

As is apparent from the foregoing description, according to the control program-developing apparatus of the present embodiment, a part of the control program of the first micro-computer (micro-computer to be subjected) is newly formed with a high-level language and the processing of a program formed by translating this new program with a machine language is executed by the development micro-computer 5 as if the newly developed program were processed by the first microcomputer 3, whereby the control of the engine 2 is effected. Accordingly, if a development is effected to improve a part of the control program initially set by an assembler language, a program corresponding to the portion to be changed can be formed by a high-level language, with which programming can be easily accomplished. Furthermore, it is possible to try to actually control the engine 2 according to the developed control program. Therefore, the control program can be developed in a short time white reducing occurrence of errors.

We claim:

1. An apparatus for developing a control program comprising:
a control unit including a first computer, said control unit controlling an object and said first computer having a memory storage device storing a first control program;
a development computer, said development computer including a program development-supporting tool for checking an operation of a new control program written by a high-level language; and
an interface computer connected between said control unit and said development computer, said interface computer including a first memory in which a result of processing of said development computer is written and a second memory in which a result of processing of said first computer is written; wherein
said interface computer includes means for transferring first data being written into said second memory to said development computer when said first computer accesses a specific address of said second memory to write said data therein;
said interface computer includes means for transferring second data being written into said first memory to said first computer when said development computer accesses a specific address of said first memory, said development computer computing said second data using said first data and said new control program; and
said first computer controls said object by utilizing said second data transferred from said first memory.

2. An apparatus as recited in claim 1, wherein said object comprises an engine.

3. An apparatus as recited in claim 1, wherein said object comprises an air flow meter.

4. An apparatus as recited in claim 1, wherein said object comprises a fuel injection valve.

5. An apparatus as recited in claim 1, wherein said object comprises a water temperature sensor.

6. A method for developing a control program for a first computer forming part of a control unit for controlling an object, said method comprising the steps of:

connecting a development computer to said first computer via an interface computer which includes a first and second memory;

accessing a specific address of said second memory by said first computer and writing data therein as written data;

transferring said written data to said development computer as transferred data as said writing process begins in said second memory;

computing using said transferred data by utilizing a control program in said development computer written in a high-level language to generate computed data;

using a program development-supporting tool to check operation of said development computer control program;

accessing a specific address of said first memory and writing said computed data into said first memory;

transferring said data written into said first memory to first computer as said writing process begins in said first memory; and controlling said object in said first computer by utilizing said data transferred from said first memory.

7. A method as recited in claim 6 further comprising the step of controlling an engine as said object.

8. A method as recited in claim 7 further comprising the step of controlling fuel injection in said engine.

* * * * *